US006461243B1

(12) United States Patent
Uehara

(10) Patent No.: US 6,461,243 B1
(45) Date of Patent: Oct. 8, 2002

(54) COIL SPRING ASSEMBLY AND DAMPER MECHANISM

(75) Inventor: Hiroshi Uehara, Hirakata (JP)

(73) Assignee: Exedy Corporation, Neyagawa ( * ) Notice: Subject to any disclaimer, the term of this patent is extended or adjusted under 35 U.S.C. 154(b) by 0 days.

(21) Appl. No.: 09/610,882

(22) Filed: Jul. 6, 2000

(30) Foreign Application Priority Data

| Jul. 19, 1999 | (JP) | ............................................ 11-205244 |
| Nov. 22, 1999 | (JP) | ............................................ 11-331998 |

(51) Int. Cl.⁷ .............................................. F16D 3/12
(52) U.S. Cl. .......................... 464/68; 192/205; 267/179
(58) Field of Search ..................... 464/66, 68; 267/170, 267/174, 179; 192/205, 212

(56) References Cited

U.S. PATENT DOCUMENTS

| 1,013,925 A | * | 1/1912 | Bliss ........................... 464/66 |
| 1,561,119 A | * | 11/1925 | Smith ..................... 267/170 X |
| 1,688,167 A | * | 10/1928 | Werz ........................... 464/66 |
| 3,662,950 A | * | 5/1972 | McIntosh et al. ........ 267/179 X |
| 4,093,198 A | * | 6/1978 | Petersen ...................... 267/179 |
| 4,475,725 A | * | 10/1984 | Niemann ................. 267/179 X |
| 4,613,029 A | * | 9/1986 | Beccaris ................... 464/68 X |
| 5,090,543 A | * | 2/1992 | Takeuchi ................ 192/205 X |
| 5,092,568 A | * | 3/1992 | Tachikawa et al. .......... 267/179 |
| 5,194,045 A | * | 3/1993 | Hanke ..................... 464/68 X |
| 5,772,515 A | | 6/1998 | Yamakawa et al. |
| 5,911,295 A | * | 6/1999 | Itonaga et al. .......... 267/179 X |
| 5,954,585 A | * | 9/1999 | Nagano et al. ............... 464/68 |

FOREIGN PATENT DOCUMENTS

| DE | 39 16 575 C1 | | 11/1990 |
| EP | 539 955 A1 | * | 5/1993 ................. 267/179 |

* cited by examiner

Primary Examiner—Greg Binda
(74) Attorney, Agent, or Firm—Shinjyu Global IP Counselors, LLP

(57) ABSTRACT

Coil spring assemblies 9 are provided for a damper mechanism of a clutch disk assembly 1 that has an increased life span. The clutch disk assembly 1 includes an input rotary member 2, an output rotary member 3 and an elastic coupling portion 4. The elastic coupling portion 4 includes a plurality of the coil spring assemblies 9. The input rotary member 2 basically includes a clutch disk 11, a clutch plate 12 and a retaining plate 13. The output rotary member 3 basically includes a hub flange 6, a hub 7 and a low-rigidity damper 8. The coil spring assemblies 9 are configured to elastically couple plates 12 and 13 to the hub flange 6 in the rotating direction. Each coil spring assembly 9 includes a coil spring 41 and a pair of spring seats 42 and 43. The spring seats 42 and 43 are engaged with the wire end surfaces of the coil spring 41, respectively, such that the coil spring 41 cannot rotate around its central axis P—P. The coil spring assembly 9 is engaged with the plates 12 and 13 and the hub flange 6 such that the coil spring assembly 9 cannot rotate around the central axis P—P of the coil spring 41.

26 Claims, 13 Drawing Sheets

Fig. 21a
Fig. 21b
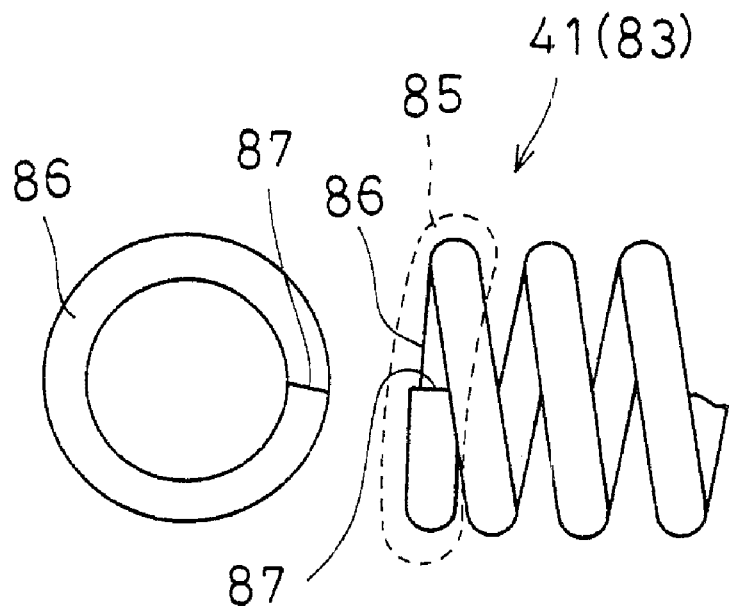
Fig. 22a
Fig. 22b
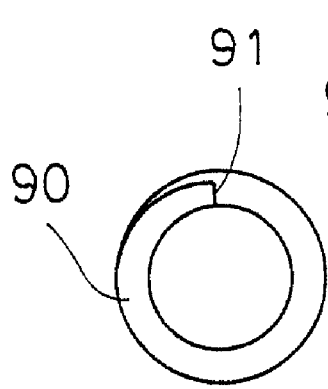
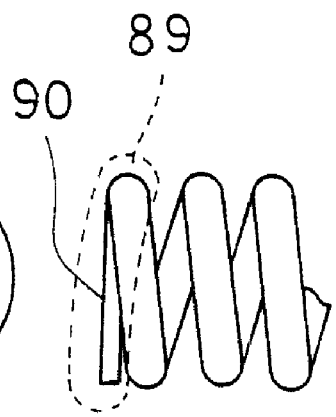

COIL SPRING ASSEMBLY AND DAMPER MECHANISM

BACKGROUND OF THE INVENTION

1. Field of the Invention

This invention generally relates to a coil spring assembly. More specifically, the present invention relates to a coil spring assembly provided with spring seats arranged on opposite ends of each coil spring.

2. Background Information

A damper mechanism used in a clutch disk assembly of a vehicle includes an input rotary member, an output rotary member and an elastic coupling mechanism. The input rotary can be coupled to an input flywheel. The output rotary member is coupled to a shaft extending from a transmission. The elastic coupling mechanism elastically couples the input and output rotary members together in a rotating direction. The input rotary member includes a clutch disk and a pair of input plates fixed to a radially inner portion of the clutch disk. The output rotary member includes a hub, which is nonrotatably coupled to the shaft. The hub includes a boss engaged with the shaft via a spline, and a flange extending radially outward from the boss. The elastic coupling mechanism includes a plurality of coil springs. Each coil spring is disposed within a window formed in the flange. Each coil spring is supported within square windows formed in a pair of input plates. When the pair of input plates rotates relatively to the hub, the coil springs are compressed between the plate pair and the hub in the rotating direction. The damper mechanism absorbs and dampens torsional vibrations in the rotating direction which are supplied to the clutch disk assembly.

Usually, the coil spring has end surfaces, which are finished into flat forms by grinding the end turns, respectively. Thereby, the end surface of the coil spring can reliably be in contact with the paired input plates and the window edge of the hub flange. However, the ground end is easily chipped.

When the coil spring is compressed in the rotating direction, the radially outer portion is compressed by an amount larger than the radially inner portion. This is due to the fact that a radially outer portion of the square windows or the like engaged with the coil spring moves a larger amount in the rotating direction than a radially inner portion. As a result, a radially inner wire portion, which absorbs deflection of the radially outer portion, is deformed by a larger amount than a radially outer wire portion. Therefore, the radially inner wire portion is subjected to a larger stress. Since the stress generated in each spring is variable depending on the positions, the life span of the coil spring is relatively short.

In view of the above, there exists a need for coil spring assembly and damper mechanism that overcomes the above mentioned problems in the prior art. This invention addresses this need in the prior art as well as other needs, which will become apparent to those skilled in the art from this disclosure.

SUMMARY OF THE INVENTION

An object of the invention is to increase the life span of a coil spring used in the damper mechanism.

According to one aspect of the present invention, a coil spring assembly is used in a damper mechanism for transmitting a torque and dampening torsional vibrations. The coil spring assembly includes a coil spring and a pair of spring seats. The coil spring has end turns not subjected to grinding. Each of the paired spring seats has a seat surface in contact with a whole end turn. According to the coil spring assembly of this aspect of the present invention, the coil spring has an end turn, which is not subjected to a grinding process. Furthermore, the paired spring seats support the unground end turns, respectively. Therefore, breakage of the coil spring end can be suppressed.

According to another aspect of the present invention, the coil spring assembly of the aforementioned aspect of the present invention further has a feature such that each of the paired spring seats has a contact surface. Each contact surface is in contact with an end surface of the end turn. Thereby, the coil spring cannot rotate with respect to the spring seat around a central axis of the spring toward the contact surface. In other words, the paired spring seats do not rotate around the central axis of the spring. This prevents rotation of the coil spring with respect to the damper mechanism.

According to another aspect of the present invention, the coil spring assembly of the previous aspect of the present invention further has a feature such that each of the paired spring seats further has an engagement portion. The engagement portion is engaged to prevent rotation with respect to the damper mechanism around the central axis of the coil spring when arranged in the damper mechanism. Therefore, the coil spring does not rotate relatively to the damper mechanism around the spring central axis. Thus, the radially outer portion and the radially inner portion of the coil spring do not change places with each other. Accordingly, the coil spring, whose radially inner portion includes a larger number of turns than those of the radially outer portion, can be arranged in the damper mechanism. This relationship with respect to the number of turns can be maintained. Thereby, it is possible to reduce a difference in the amount of deformation per turn between the radially inner and outer portions of the spring in the compressed state. Thus, it is possible to reduce a difference in stress generated per turn between the radially inner and outer portions of the coil spring.

According to another aspect of the present invention, a damper mechanism includes an input rotary member, an output rotary member and a coil spring assembly. The coil spring assembly is provided for elastically coupling the input rotary member and the output rotary member together in a rotating direction. The coil spring assembly has a coil spring and a pair of spring seats. The paired spring seats are engaged with ends of the coil spring such that the coil spring is nonrotatable around its central axis relatively to the spring seat. The paired spring seats are engaged with the input and output rotary members. The paired spring seats are nonrotatable relatively to the input and output rotary members around the central axis of the coil spring. According to the damper mechanism of this aspect of the present invention, the paired spring seats prevent the coil spring from rotation around its central axis with respect to the input and output rotary members. Thus, the radially inner portion and the radially outer portion of the coil spring do not change places with each other. Accordingly, the coil spring, whose radially inner portion includes a larger number of turns than those of the radially outer portion, can be arranged in the damper mechanism. This relationship with regard to the number of turns can be maintained. Thereby, it is possible to reduce a difference in the amount of deformation per turn between the radially inner and outer portions of the spring in the compressed state. Thus, it is possible to reduce a difference in stress generated per turn between the radially inner and outer portions of the coil spring.

According to another aspect of the present invention, the damper mechanism of the previous aspect of the present invention further has a feature such that, in the radial direction of the damper mechanism, the turns on the inner side of the coil spring are larger in number than those on the outer side of the coil spring.

According to another aspect of the present invention, a coil spring assembly is used in a damper mechanism for transmitting a torque and dampening torsional vibrations. The coil spring assembly includes a coil spring and a pair of spring seats. The coil spring has end turns. Each of the paired spring seats has a seat surface and a contact surface. The seat surface is in entire contact with the end turn. The contact surface is in contact with the end surface of the end turn such that the coil spring is nonrotatable around its axis. Thereby, the coil spring cannot rotate with respect to the spring seat around the spring central axis toward the contact surface. Thus, by preventing the rotation of the paired spring seats around the spring central axis, the coil spring cannot rotate with respect to the damper mechanism.

According to another aspect of the present invention, the coil spring assembly of the previous aspect of the present invention further has a feature such that each of the paired spring seats further has an engagement portion. The engagement portion is engaged to prevent rotation with respect to the damper mechanism around the central axis of the coil spring when arranged in the damper mechanism. Therefore, the coil spring does not rotate relatively to the damper mechanism around the spring central axis. Thus, the radially outer portion and the radially inner portion of the coil spring do not change places with each other. Accordingly, the coil spring, whose radially inner portion includes a larger number of turns than those of the radially outer portion, can be arranged in the damper mechanism. This relationship regarding the number of turns can be maintained. Thereby, it is possible to reduce a difference in the amount of deformation per turn between the radially inner and outer portions of the spring in the compressed state. Thus, it is possible to reduce a difference in stress generated per turn between the radially inner and outer portions of the coil spring.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 21a is an end elevational view of one of the coil springs to be used with one of the coil spring assemblies according to certain embodiments of the present invention;

FIG. 21b is a partial side elevational view of one of the coil springs to be used with one of the coil spring assemblies according to certain embodiments of the present invention;

FIG. 22a is an end elevational view of one of the coil springs to be used with one of the coil spring assemblies according to an alternate embodiment of the present invention;

FIG. 22b is a partial side elevational view of one of the coil springs to be used with one of the coil spring assemblies according to an alternate embodiment of the present invention;

DETAILED DESCRIPTION OF THE PREFERRED EMBODIMENTS

Figure 1:
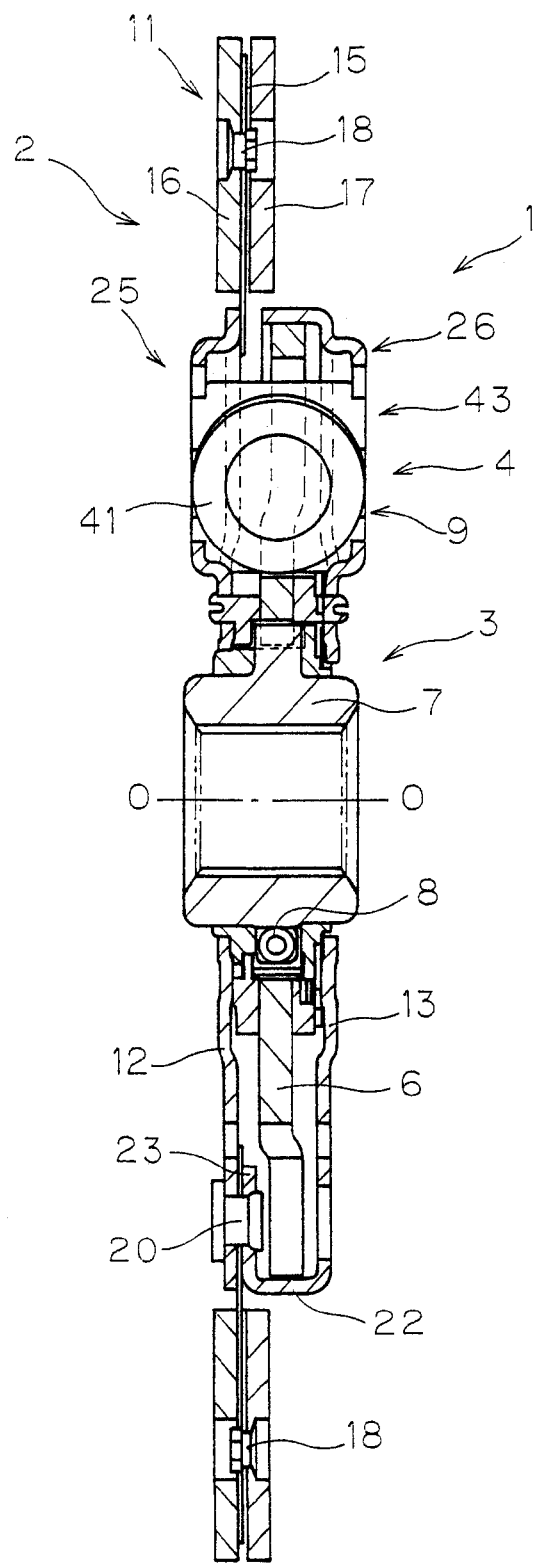
FIG. 1 is a schematic cross-sectional view of a clutch disk assembly in accordance a first embodiment of the present invention.
Figure 2:
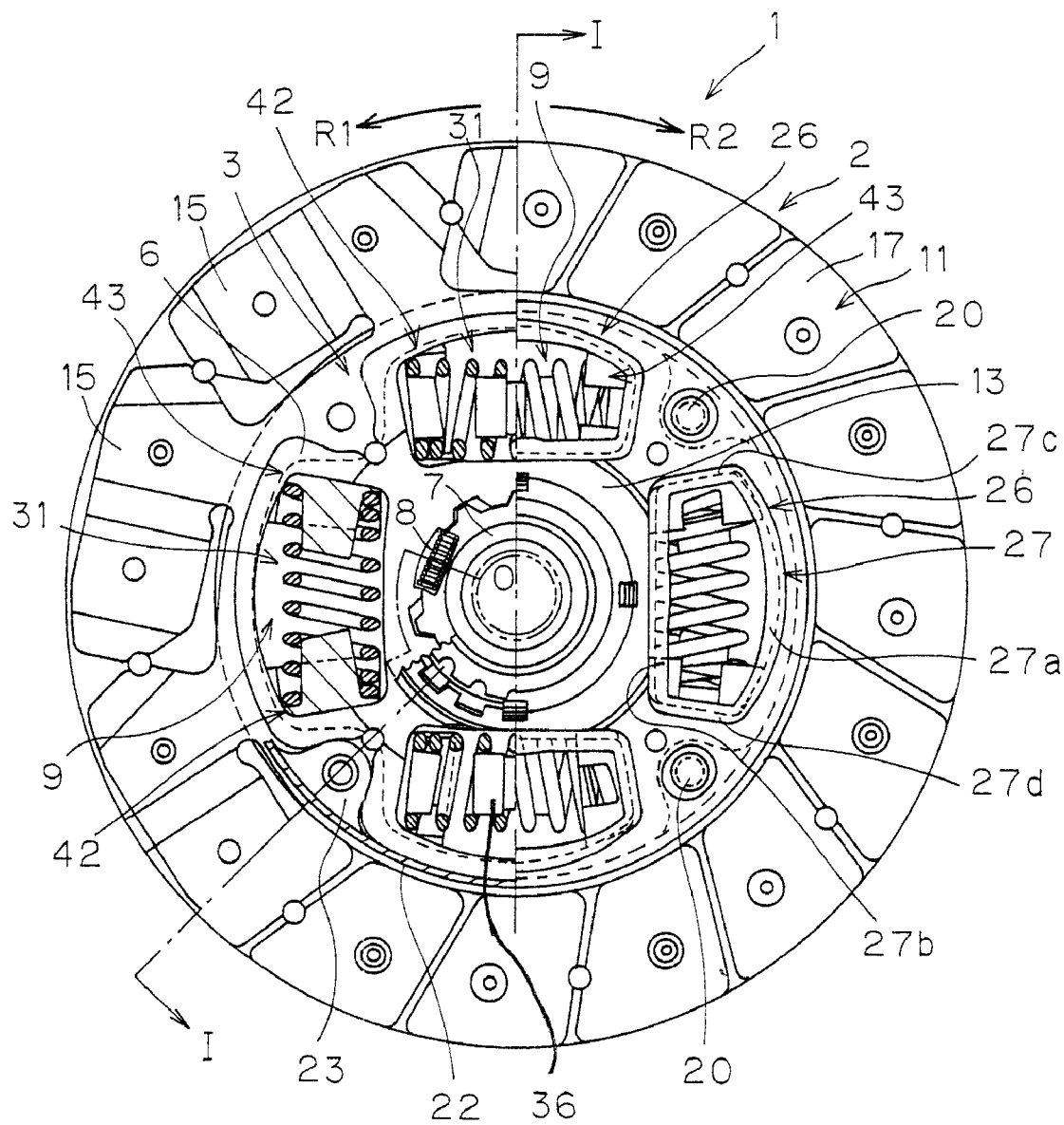
FIG. 2 is a side elevational view of the clutch disk assembly illustrated in FIG. 1 with certain parts removed for illustrative purposes.

Referring initially to FIGS. 1 and 2, a clutch disk assembly 1 is illustrated in accordance with one embodiment of the present invention. The clutch disk assembly 1 is a power transmission device used in a clutch device of a vehicle. The clutch disk assembly 1 has a clutch function and a damper function. The clutch function of the clutch disk assembly 1 works to transmit and interrupt torque by engagement and disengagement with respect to a flywheel (not shown) in a well known manner. The damper function of the clutch disk assembly 1 operates to absorb and dampen torque variations applied from the flywheel side as explained below.

As seen in FIG. 1, centerline O—O represents a rotation axis of the clutch disk assembly 1. An engine and the flywheel (both not shown) are arranged on the left side in FIG. 1. A transmission (not shown) is disposed on the right side in FIG. 1. Referring now to FIG. 2, an arrow R1 indicates a drive direction (positive side in the rotating direction) of the clutch disk assembly 1. An arrow R2 indicates a reverse direction (negative side in the rotating direction). In the following description, the terms the "rotating or circumferential direction," the "axial direction" and the "radial direction" means the respective directions in the clutch disk assembly 1 serving as the damper mechanism unless otherwise specified.

As seen in FIG. 1, the clutch disk assembly 1 is primarily formed of an input rotary member 2, an output rotary member 3 and an elastic coupling portion 4. The elastic coupling portion 4 is disposed between the input and output rotary members 2 and 3. The input rotary member 2 is a member to which a torque is supplied from the flywheel (not shown). The input rotary member 2 is primarily formed of a clutch disk 11, a clutch plate 12 and a retaining plate 13. The clutch disk 11 is configured to be pressed against the flywheel (not shown) for engagement. The clutch disk 11 includes a cushioning plate 15 and a pair of friction facings 16 and 17. The friction facings 16 and 17 are fixedly coupled to the axially opposite sides of the cushioning plate 15 by a plurality of rivets 18.

The clutch and retaining plates 12 and 13 are made of circular and annular plates prepared by press work, respectively, in a conventional manner. The clutch and retaining plates 12 and 13 are axially spaced from each other by a predetermined distance. The clutch plate 12 is disposed on the engine side. The retaining plate 13 is disposed on the transmission side. The retaining plate 13 is provided at its radially outer portion with a cylindrical wall 22 extending toward the clutch plate 12. Furthermore, the free end of the cylindrical wall 22 has a plurality of fixing portions 23 projecting radially inward therefrom. The fixing portions 23 are disposed on the transmission side surface of the clutch plate 12. The fixing portions 23 are fixedly coupled to the clutch plate 12 by a plurality of rivets 20. Thereby, the clutch and retaining plates 12 and 13 are configured to rotate together, and are spaced by a fixed distance. The rivets 20 also fix the radially inner portion of the cushioning plate 15 to the fixing portions 23 and the radially outer portions of the clutch plate 12.

The clutch and retaining plates 12 and 13 are axially spaced apart and provided with central apertures, respectively to accommodate the output rotary member 3. More specifically, the output rotary member 3 includes a hub 7, a hub flange 6 and a low-rigidity damper 8. The hub 7 is disposed within the central apertures of the clutch plate 12 and the retaining plate 13, which will be described later. The clutch and retaining plates 12 and 13 are provided with a plurality of windows 25 and 26 arranged in the circumferential direction. More specifically, there are four windows 25 or 26 in each of the plates 12 and 13, respectively. The windows 25 and 26 are circumferentially and equally spaced from each other on their respective plates.

Referring to FIG. 2, the windows 26 of the retaining plate 13 will now be described in detail. Each window 26 is arranged to extend in a substantially circumferential direction. Each window 26 is formed from an axial aperture opening through the sides of the plate 13, and a spring support portion 27 formed along the edge of this aperture. The spring support portion 27 includes a radially outer support portion 27a, a radially inner support portion 27b and a pair of rotating-direction support portions 27c and 27d. The rotating direction support portions 27c and 27d are located on the R1 side and the R2 side, respectively. The radially outer support portion 27a has a curved form extending substantially in the circumferential direction.

Figure 3:
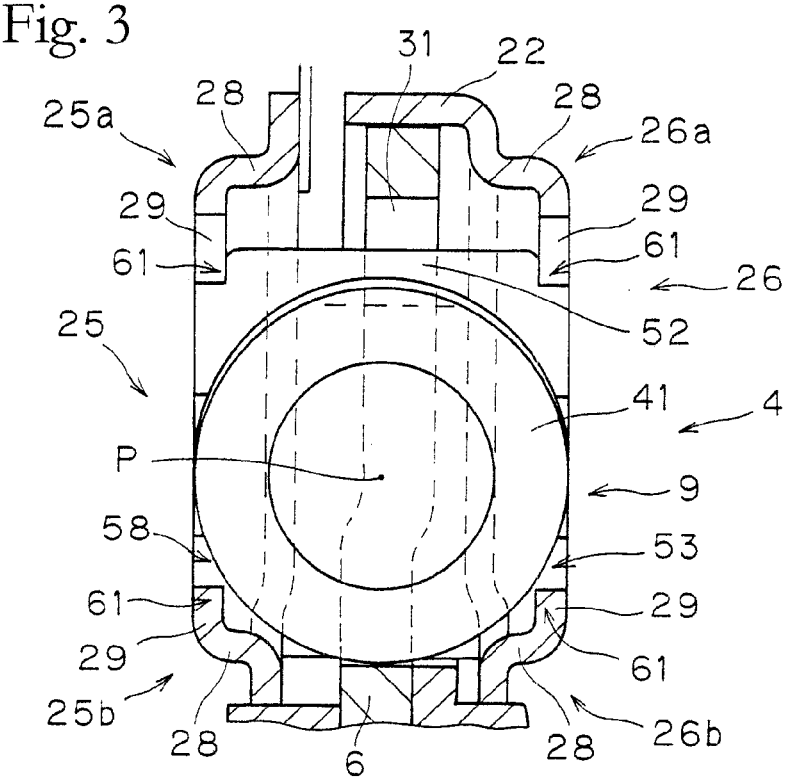
FIG. 3 is an enlarged partial cross-sectional view of the clutch disk assembly illustrated in FIGS. 1 and 2, showing one of the elastic coupling portions.

The radially inner support portion 27b extends substantially straight. Each of the rotating-direction support portions 27c and 27d extends substantially straight in a generally radial direction. More specifically, each of the rotating-direction support portions 27c and 27d extends in a direction which is not parallel to a line extending through the circumferential center of the window 26 and the center O of the clutch disk assembly 1. Each of the rotating-direction support portions 27c and 27d is inclined to shift the radially inner side toward the circumferentially inner side (i.e., toward the circumferential center of the window 26) with respect to the radially outer side. Therefore, the rotating-direction support portions 27c and 27d are not parallel to each other. Each of the support portions 27a–27d shown in FIG. 2 includes a first portion 28 and a second portion 29 as seen in FIG. 3. The first portion 28 extends in a substantially axial direction relative to the clutch assembly 1. The second portion 29 extends radially toward the inner side of the window 26 from the first portion 28. Since the windows 25 and 26 have similar structures, the structure of the window 25 will not be described. Moreover, some of the same reference numerals will be used to indicate portions of the windows 25 that are identical to the same portions of the windows 26.

Referring to FIG. 2, the output rotary member 3 will now be briefly described. As mentioned above, the output rotary member 3 includes the hub 7, the hub flange 6 and a low-rigidity damper 8. As seen in FIG. 1, the hub 7 is a cylindrical member disposed within the central apertures of the clutch and retaining plates 12 and 13. The hub 7 is adapted to be engaged with a transmission input shaft (not shown), which is fitted into the center splined bore of hub 7.

The hub flange 6 of an annular disk-like form is disposed radially outside the hub 7. More specifically, the hub flange 6 is disposed axially between the clutch and retaining plate 12 and 13. The radially inner portion of the hub flange 6 is coupled to the hub 7 by the low-rigidity damper 8 in a conventional manner. When the hub flange 6 rotates relatively to the hub 7, small coil springs arranged in the low-rigidity damper 8 are compressed in the rotating direction as best seen in FIG. 2.

Figure 11:
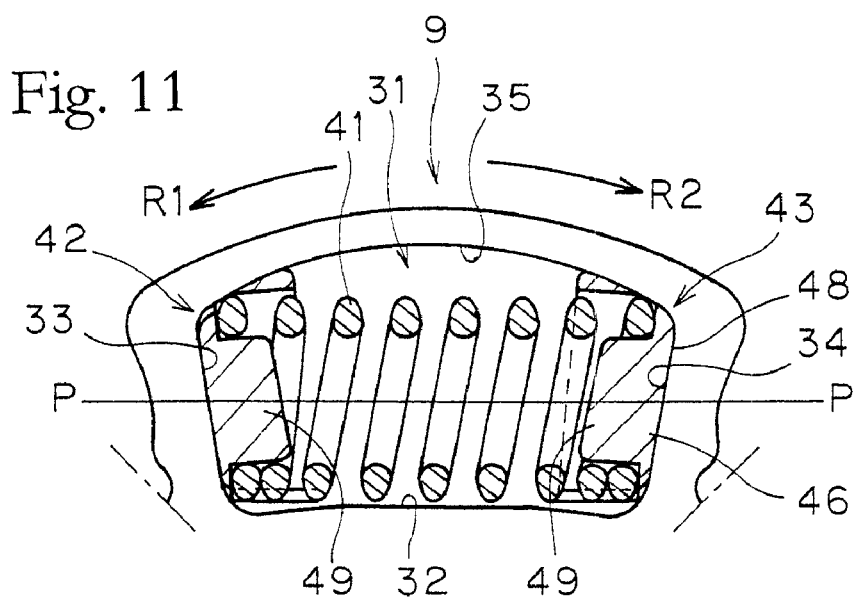
FIG. 11 is a partial side elevational view of a coil spring assembly of the clutch disk assembly of FIG. 1 with certain parts shown in cross section and utilizing spring seats illustrated in FIGS. 5 and 6.

Referring again to FIG. 1, the outer peripheral surface of the hub flange 6 is located radially inside the wall 22 of the retaining plate 13. Thus, the outer periphery of the hub flange 6 is covered by the wall 22. As seen in FIG. 2, the hub flange 6 is provided with windows 31 corresponding to the windows 25 and 26. Thus, the windows 31 are arranged in the circumferentially equally spaced four positions, respectively. Each window 31 is opened at its axially opposite sides. Each window 31 has a form substantially corresponding to those of the windows 25 and 26. Referring to FIG. 11, each window 31 extends in a substantially circumferential direction. Each window 31 has a radially outer support portion 35, a radially inner support portion 32 and a pair of rotating-direction support portions 33 and 34. The rotating-direction support portion 33 is disposed on the R1 side. The rotatingdirection support portion 34 is disposed on the R2 side. The radially outer support portion 35 has a curved form extending in the circumferential direction. The radially inner support portion 32 has a substantially straight form. The rotating-direction support portions 33 and 34 extend substantially straight in a generally radial direction. More specifically, the rotating-direction support portions 33 and 34 are not parallel to the line extending between the circumferential center of the window 31 and the center O of the clutch disk assembly 1. The rotating-direction support portions are inclined to shift their radially inner sides toward the circumferentially inner position of the window 31 with respect to the radially outer side. Therefore, the rotating-direction support portions 33 and 34 are not parallel to each other.

Still referring to FIG. 1, the elastic coupling portion 4 includes of a plurality of coil spring assemblies 9. As seen in FIGS. 1 and 2, each coil spring assembly 9 is disposed within the window 31 and the windows 25 and 26. Referring to FIG. 11, each coil spring assembly 9 includes a coil spring 41 and a pair of spring seats 42 and 43. The spring seats 42 and 43 are arranged on opposite ends of the coil spring 41.

Each coil spring 41 preferably has an elliptic or oval form. Each coil spring 4 is preferably formed of a wire that has a substantially uniform cross-section. Each coil spring 41 has opposite ends, which are closed to form end turns, respectively. In the preferred embodiment, the surface of each end turn was not subjected to grinding, and the end turn keeps a sectional form of the coil material. The end turn in this embodiment is a portion corresponding to one turn (360°) of the coil spring 41 at each end.

Figure 4:
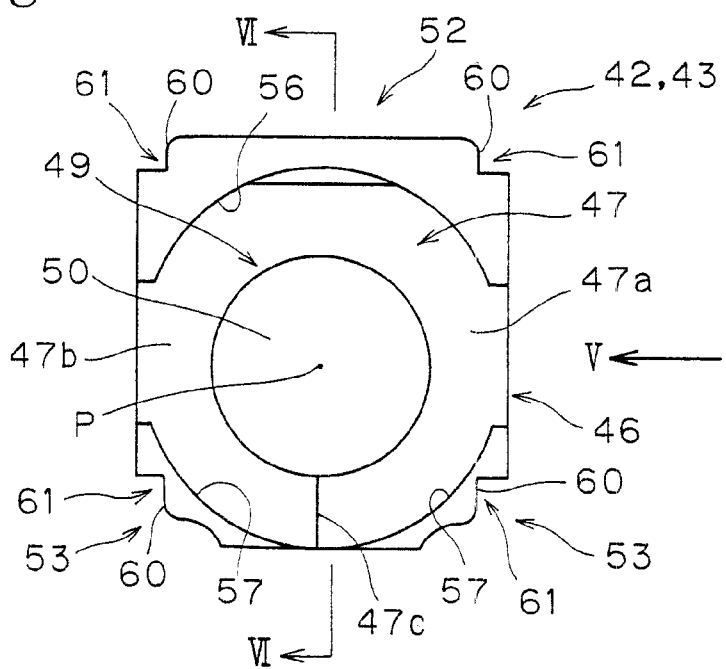
FIG. 4 is an elevational view of one of the spring seats of the clutch disk assembly illustrated in FIGS. 1–3.
Figure 5:
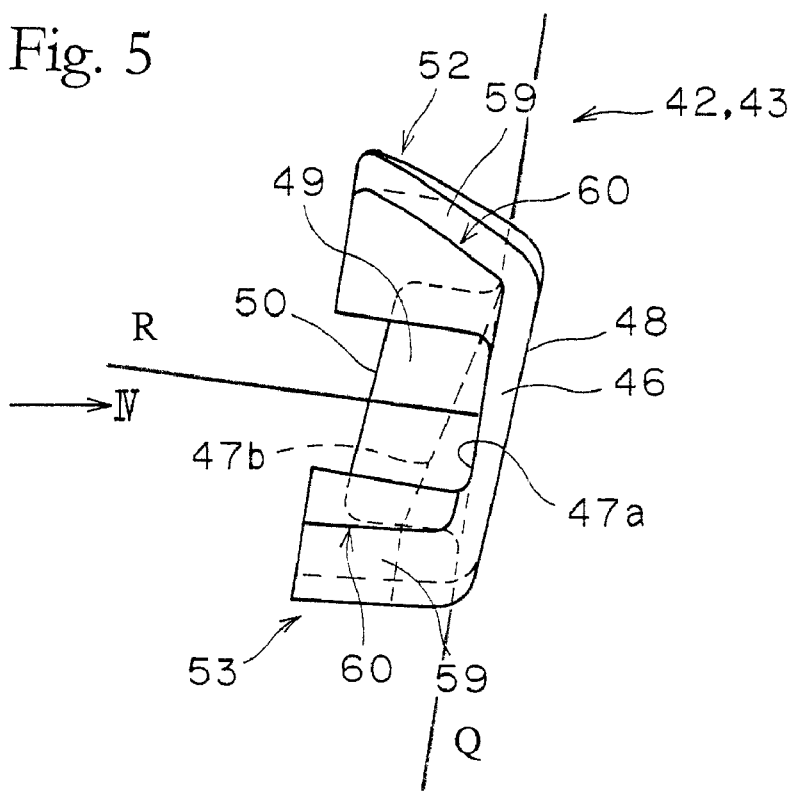
FIG. 5 is a side elevational view of the spring seat illustrated in FIG. 4 as viewed along an arrow V in FIG. 4.
Figure 7:
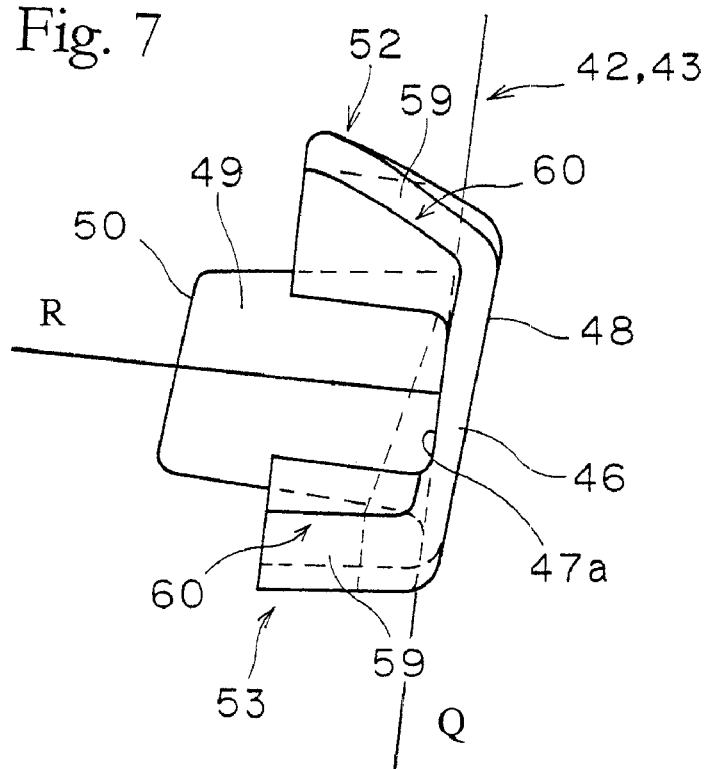
FIG. 7 is a side elevational view, similar to FIG. 5, of an alternate spring seat with an elongated projection in accordance with another embodiment of the present invention.

The spring seats 42 and 43 are preferably constructed as a one-piece, unitary member that is made of hard resin or elastic resin. The elastic resin is, e.g., a thermoplastic polyester elastomer. As seen in FIG. 4, a seat portion 46 of each of the spring seats 42 and 43 has a seat surface 47 for receiving the end turn surface of the coil spring 41. As seen in FIG. 5, a rear surface 48 remote from the seat portion 46 is supported in the windows 25, 26 and 31. As can be seen from FIG. 4, the seat surface 47 has a circular form as viewed along axis P. As seen in FIGS. 5 and 7, the seat surface 47 has a first substantially flat semicircular section 47a that is substantially congruent with a plane Q, and a second semicircular section 47b with an inclined surface that is inclined relative to the plane Q. The inclined surface of the second semicircular section 47b rises along a center axis R of the spring seat as the position moves counterclockwise in the elevational view. The plane Q is perpendicular to the center axis R. One end of the second semicircular section 47b is continuous with the first semicircular section 47a, and the other end of the second semicircular section 47b forms a stepped portion with respect to the first semicircular section 47a. This stepped portion provides a contact surface 47c directed in the circumferential direction of the seat surface 47 (counterclockwise in the elevational view). The seat surface 47 is complementary in shape with the end turn surface of the coil spring 41. The contact surface 47c is in contact with the end surface of the end turn.

The spring seats 42 and 43 have the same form. Therefore, the contact surfaces 47c of the spring seats 42 and 43 are directed in the opposite directions (opposed directions) in the circumferential direction of the seat surface, respectively, when the spring seats 42 and 43 are installed at opposite ends of one of the coil springs 41.

Figure 6:
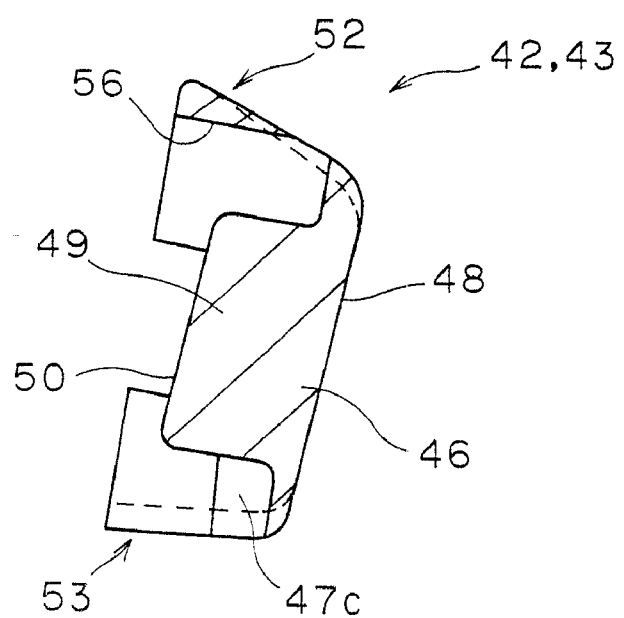
FIG. 6 is a cross-sectional view of the spring seat illustrated in FIG. 4 taken along section line VI–V in FIG. 4.

As shown in FIG. 11, each seat portion 46 is provided with a center projection 49 projecting toward the circumferential center of the window 31. Referring now to FIGS. 5 and 6, the projection 49 has a substantially columnar form. A top surface 50 of the projection 49 extends straight in the axial direction, but is inclined in an elevational view (i.e., when viewed in the axial direction). The top surface 50 is inclined such that a radially outer portion thereof is shifted away from the center of the window 31 with respect to the radially inner portion thereof.

A radially outer support portion 52 is formed radially outside the seat portion 46, and is located on the surface of the same side as the projection 49. The radially outer support portion 52 is provided at its radially inner side with an arc-shaped support surface 56 extending along the seat surface 47. The support surface 56 supports not only the outer periphery of the end turn of the coil spring 41, but also the axially opposite ends.

Referring again to FIG. 4, the seat portion 46 is provided at axially opposite sides of its radially inner portion with a pair of inner support portions 53, respectively. Each inner support portion 53 has an arc-shaped support surface 57 extending along the seat surface 47. The radially inner support portions 53 support the radially inner side and the axially opposite sides of the coil spring 41.

As seen in FIG. 5, each of the axially opposite end surfaces 59 of the seat portion 46 forms a portion of a flat surface 60. Referring back to FIG. 4, the flat surface 60 extends in a flat form to the side surfaces of the axial ends of the radially outer support portion 52 and the radially inner support portion 53. The flat surface 60 is located at a level lower than that of the other surfaces of the outer and inner support portions 52 and 53. Therefore, stepped portions 61 are formed the outer and inner support portions 52 and 53. As seen in FIG. 3, these stepped portions 61 are in contact with the radially outer support portion 26a, inner support portion 26b. The stepped portions 61 are also in contact with the rotating-direction support portions 27c and 27d of the window 26 shown in FIG. 2. As seen in FIG. 3, more specifically, a section of the second portion 29 of each support portion is in contact with an axial surface of the stepped portion 61. Referring now to FIGS. 3 and 4, the surface on the engine side (in the axial direction) of the second portion 29 is in contact with the flat surface 60. In the window 25, similar structures are employed. In the above engaged state, the spring seats 42 and 43 can move away in the rotating direction from the circumferential ends of the windows 25 and 26 (i.e., toward the circumferentially opposite ends), respectively. However, the spring seats 42 and 43 are nonmovably coupled with the windows 25, 26 and 37 in the axial and radial directions of the clutch disk assembly. Further, as can be seen in FIGS. 1, 2 and 11, the spring seats 42 and 43 are engaged with the clutch and retaining plates 12 and 13 in such a fashion that does not allow rotation around the central axis P—P of the coil spring 41.

Furthermore, as seen in FIG. 11, the spring seats 42 and 43 are supported by the rotating-direction support portions 33 and 34 of the window 31, respectively. More specifically, the rear surfaces 48 are in contact with the rotating-direction support portions 33 and 34, respectively. Further, as seen in FIGS. 5 and 11, the radially outer support portions 52 are in contact with the radially outer support portion 35 of window 31. A slight radial space is kept between the radially inner support portions 53 and 32. In this engaged state, the spring seats 42 and 43 can be spaced in the rotating direction from the circumferential ends of the window 31 (toward the opposite ends, respectively). However, the spring seats 42 and 43 are axially and radially nonrotatable with respect to the circumferential ends of the windows 31. The spring seats 42 and 43 are engaged with the hub flange 6 in such a fashion that the spring seats 42 and 43 cannot rotate around the central axis P—P of the coil spring 41. This is owing to the fact that the rotating-direction support portions 33 and 34, which support the spring seats 42 and 43, respectively, are not parallel to each other with respect to the rotating direction. Rather, the rotating-direction support portions 33 and 34 are inclined with respect to each other.

Each of the circumferentially opposite end surfaces of the coil spring 41 is entirely in contact with the seat surface 47 of the seat portion 46. The free end surface of the coil spring 41 is in contact with the contact surface 47c as seen in FIGS. 6 and 11. Thereby, the coil spring 41 cannot rotate around its own central axis P—P with respect to the paired spring seats 42 and 43. Thus, the contact surfaces 47c of the paired spring seats 42 and 43 are directed oppositely to each other in the winding direction of the coil spring 41. Thus, the coil spring 41 can rotate in neither direction around the central axis P—P. In the coil spring 41 arranged as described above, there are seven radially inner side turns, and six radially outer side turns (excluding the end turns). Thus, the number of turns on the radially inner side is larger by one than the number of turns on the radially outer side. The coil spring 41 does not rotate around the spring central axis P—P with respect to the spring seats 42 and 43. Furthermore, the spring seats 42 and 43 do not rotate with respect to the plates 12 and 13 around the spring central axis P—P. Therefore, the above state of the coil spring 41 is maintained. Thus, the number of turns on the radially inner side of the coil spring 41 is always larger than the number of turns on the radially outer side.

Figure 8:
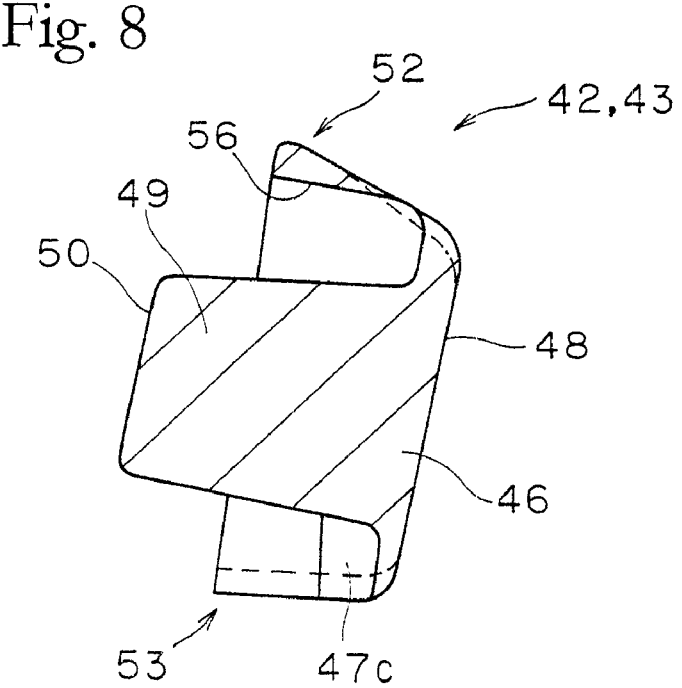
FIG. 8 is a cross-sectional view of the spring seat illustrated in FIG. 7.
Figure 9:
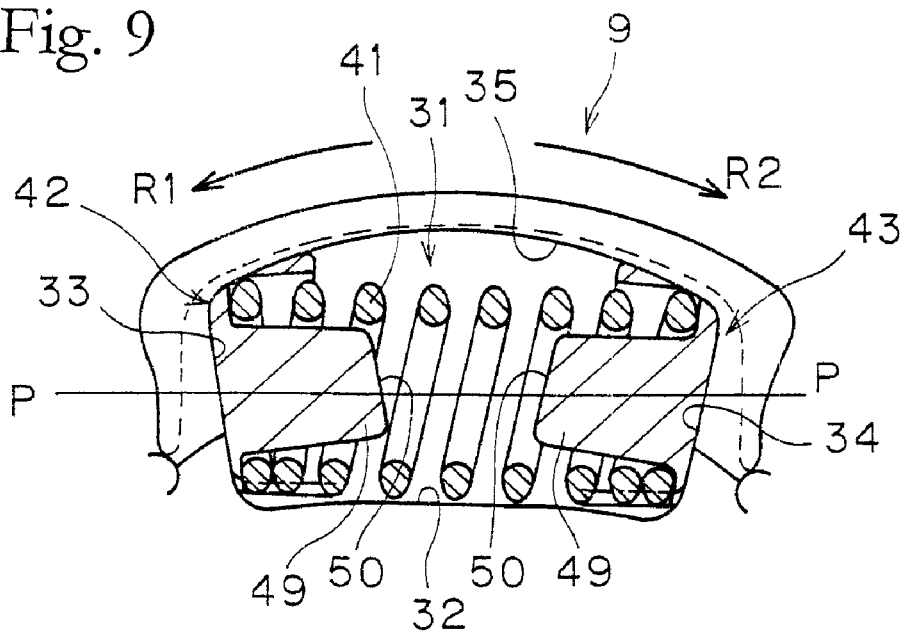
FIG. 9 is a partial side elevational view of a portion of the coil spring assembly of the clutch disk assembly illustrated in FIG. 1 that utilizes spring seats (shown in cross-section) illustrated in FIGS. 7 and 8.

As seen in FIG. 2, the projections 49 of the spring seats 42 and 43 are arranged in the windows 31 located at the upper and lower positions. The aforementioned projections 49 are circumferentially shorter than the radially outer and inner support portions 52 and 53 as shown in FIGS. 5 and 6. However, other projections 49 of the spring seats 42 and 43 are arranged in the windows 31 located at the left and right positions in FIG. 2. Those projections 49 are circumferentially longer than the radially outer and inner support portions 52 and 53 as shown in FIGS. 7 and 8.

Figure 10:
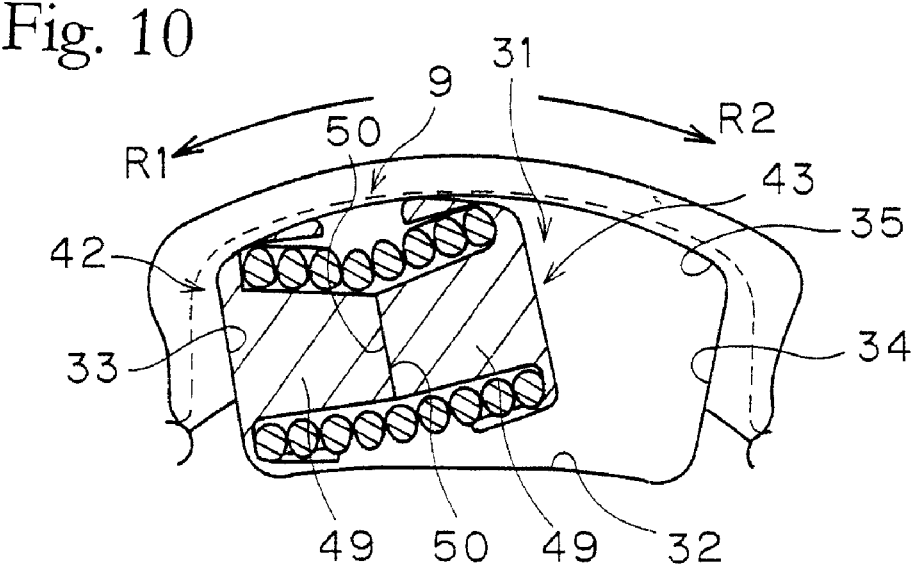
FIG. 10 is a partial side elevational view of the coil spring assembly illustrated in FIG. 9 after compression of the coil spring (shown in cross section) according to an embodiment of the present invention.

As seen in FIG. 2, rubber floats 36 are arranged within the paired coil springs 41 that are located at the upper and lower positions in FIG. 2, respectively. Each rubber float 36 is a member, which is pinched between the projections 49 of the spring seats 42 and 43 when the springs 41 are compressed. Thus, the rubber floats 36 generate a large torque (stop torque) when the coil springs 41 are compressed to a large or certain extent. The two spring seats 42 and 43 at the left and right positions in FIG. 2 can generate a large torque (stop torque) owing to mutual contact between the projections 49 when the coil springs 41 are compressed to a large or certain extent as can be seen in FIG. 10.

According to this embodiment, as described above, the stop mechanism is achieved by the combination of the rubber float and the spring seats as well as the combination of the spring seats. However, the structure of the stop mechanism is not restricted to the above. More specifically, the stop mechanism can be achieved only by the combination of the rubber float and the spring seats, only by the combination of the springs or only by another structure in which the plates 12 and 13 are in direct contact with the hub flange 6.

The operation of the clutch disk assembly 1 will now be described below. The plates 12 and 13 of the clutch disk assembly 1 are in the free state as shown in FIGS. 1 and 2. The plates 12 and 13 are normally twisted or rotated relatively to the hub flange 6 in the direction of the arrow R1 when a driving force is applied to the friction facings 16 and 17. As seen in FIGS. 9–12, the coil springs 41 are compressed in the rotating direction between the rotating-direction support portions 33 of the windows 31 and the rotating-direction support portions 27d and others of the windows 25 and 26, which are shown in FIG. 3. In this operation, the radially outer portions of the coil springs 41 are deformed by an amount larger than that of the radially inner portion. However, the difference in the amount of deformation per turn is smaller than that in the prior art. Furthermore, the difference in the amount of deformation per turn occurs between the radially outer and inner portions because the number of turns of the radially inner portion is larger than the number of turns of the radially outer portion. Thus, the radially outer portion causes a larger deformation per turn than the radially inner portion. However, the difference between the deformation of the radially outer and inner portions is smaller than that in the prior art. This invention can suppress a difference in generated stress between the radially inner and outer portions of the coil springs 41. In other words, a difference which occurs in stress generated per turn between the radially inner and outer portions can be small. As a result, the coil springs 41 can have an increased life span.

Since the radially outer portion of the coil spring 41 has a smaller number of turns, the coil spring 41 in the fully compressed state is short. This means that the elastic coupling portion 4 can provide a large maximum torsion angle.

Since the coil spring 41 has the end turns of which surfaces are not subjected to grinding, the cost thereof is relatively low. The spring seats 42 and 43 are inexpensive. Furthermore, the structure of the invention is more advantageous than structures in which the spring seats are not used and coil springs having end surfaces subjected to grinding are employed. Since the coil spring 41 is not subjected to grinding, breakage thereof can be suppressed effectively. Since grinding is not performed, the end of the coil spring 41 can reliably have an area similar to that of the other portion, and therefore can be reliably in contact with the contact surface 47c shown in FIG. 4.

Figure 12:
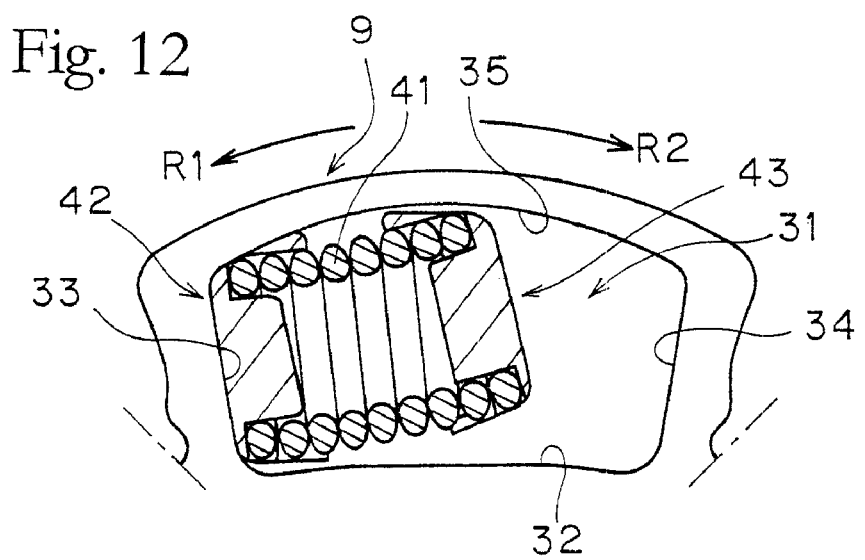
FIG. 12 is a partial side elevational view of the coil spring assembly illustrated in FIG. 11 after compression of the coil spring (shown in cross section) according to an embodiment of the present invention.

FIG. 10 shows a state where the projections 49 of the paired spring seats 42 and 43 are in contact with each other. FIG. 12 shows another embodiment in which the rubber float is not employed, and more specifically a state where the coil spring 41 is in the fully compressed state.

Second Embodiment

Referring now to FIGS. 13–20, a clutch disk assembly 1' is illustrated which is a modified version of the first embodiment. In particular, modified coil spring assemblies 9' are used in this second embodiment of the present invention. Since many of the structures of this second embodiment are similar to those of the first embodiment, those similar structures of this second embodiment will not be described below. Rather, the description of the similar structures should be obtained from the first embodiment discussed above.

The clutch plate (not shown in second embodiment) and the retaining plate 13' are each provided with a plurality of identical windows 68, which are arranged in a circumferential direction. The windows 68 of the retaining plate 13' will now be described in detail. Each window 68 is formed from an axial aperture opened on the opposite sides of the retaining plate 13', and a spring support portion 69 formed along the edge of this aperture. The spring support portion 69 includes a radially outer support portion 69a, a radially inner support portion 69b and rotating-direction support portions 69c and 69d, which are located on the R1 side and the R2 side, respectively. The radially outer support portion 69a has a curved form extending substantially in the circumferential direction. The radially inner support portion 69b extends substantially straight. Each of the rotating-direction support portions 69c and 69d extends substantially straight in the radial direction. More specifically each of the rotating-direction support portions 69c and 69d extends in a direction which is not parallel to a line extending through the circumferential center of the window 68 and the center O of the clutch disk assembly 1'. Each of the rotating-direction support portions 69c and 69d is inclined to shift the radially inner side toward the circumferentially inner side (i.e., toward the circumferential center of the window 68) with respect to the radially outer side. Therefore, the rotating-direction support portions 69c and 69d are not parallel to each other. Each of the inner and outer support portions 69a and 69b includes a partially cut and bent portion. Each of the rotating-direction support portions 69c and 69d includes partially cut and bent portions located in the radially opposite sides as well as a plate section portion located in the radially middle portion.

The hub flange 6 is provided with windows 31 corresponding to the windows 68. The windows 31 have the same structure as those in the first embodiment.

Figure 13:
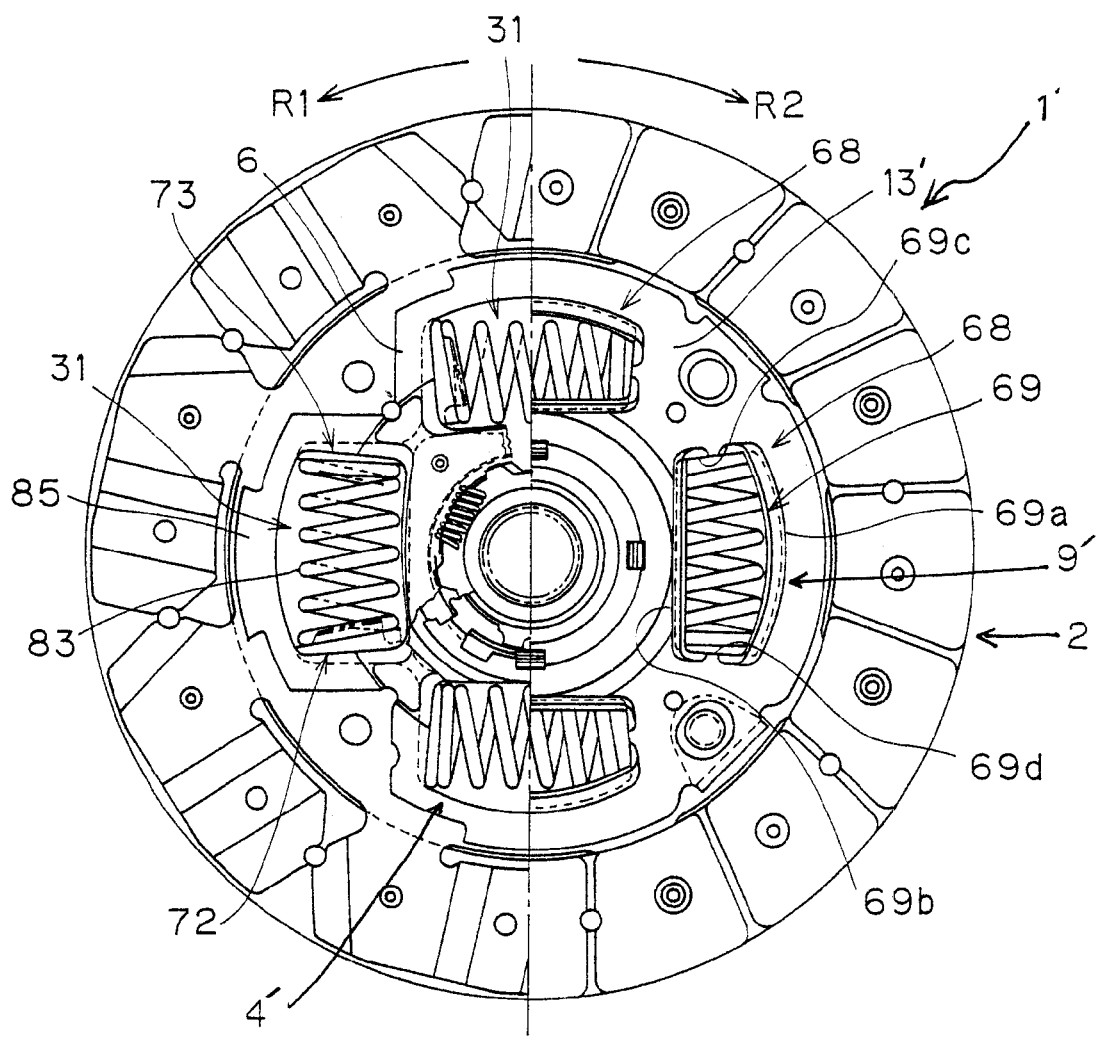
FIG. 13 is a side elevational view of a clutch disk assembly of an alternate embodiment of the present invention with certain parts removed for illustrative purposes.
Figure 19:
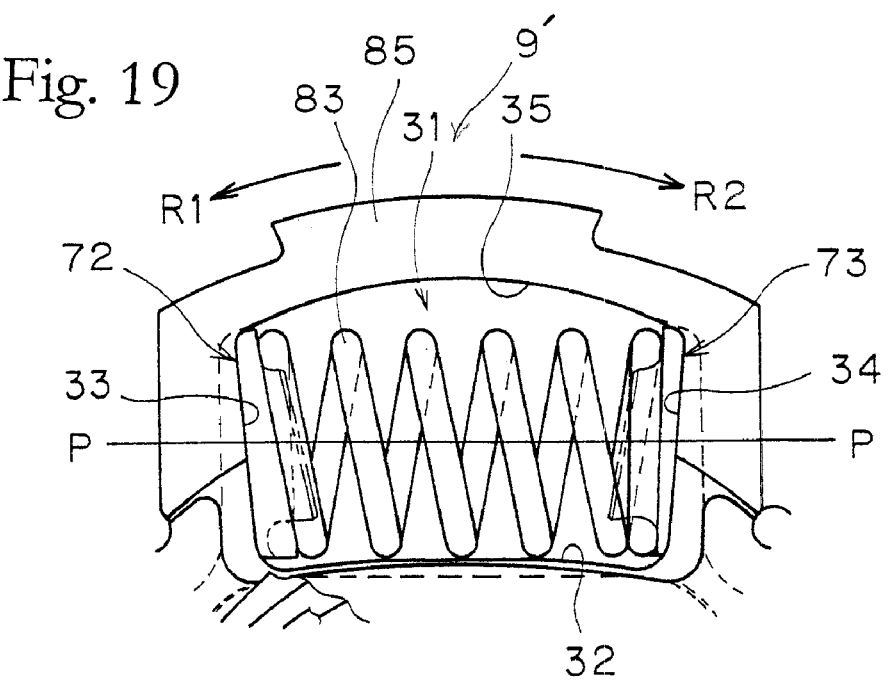
FIG. 19 is an elevational view of the coil spring assembly of the clutch disk assembly illustrated in FIG. 13.

As shown in FIG. 13, the elastic coupling portion 4' includes the plurality of coil spring assemblies 9'. Each coil spring assembly 9' is disposed within the windows 31 and 68 shown in FIG. 13. As seen in FIG. 19, each coil spring assembly 9' includes a coil spring 83, and a pair of spring seats 72 and 73 arranged on the opposite sides thereof, respectively. As seen in FIG. 21b, each coil spring 83 has opposite ends, which are closed, i.e., the end turns are bent so that the ends of the wire forming the end turns touch the side of the wire. However, the surfaces of the end turns were not subjected to grinding. Thus, the end turns keep cross-sectional forms of the wire forming the coil material. The end turn in this embodiment is a portion corresponding to one turn of the coil spring 83 in each end.

Figure 14:
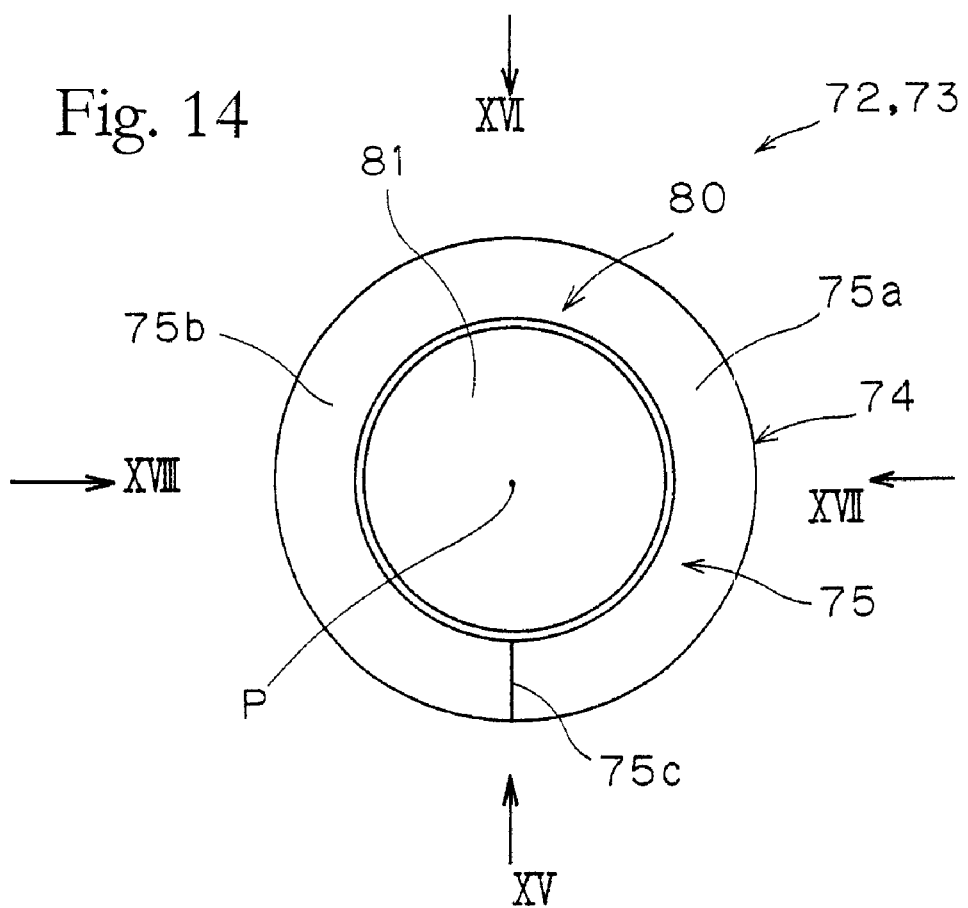
FIG. 14 is an end elevational view of a spring seat according to an alternate embodiment of the present invention.
Figure 15:
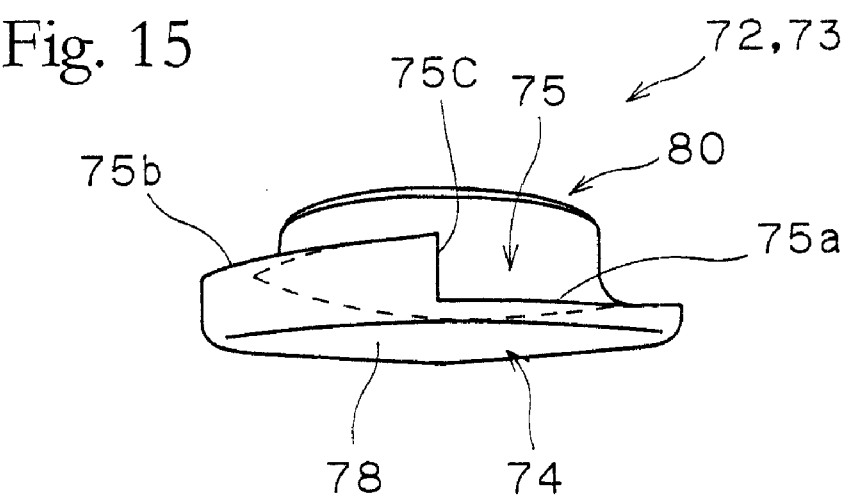
FIG. 15 is a perspective view of the spring seat of FIG. 14 as viewed along arrow XV in FIG. 14.
Figure 16:
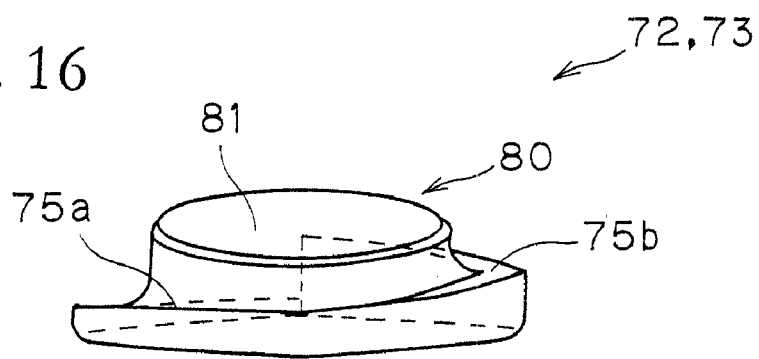
FIG. 16 is perspective view of the spring seat of FIG. 14 as viewed along arrow XVI in FIG. 14.

Referring to FIGS. 14 to 18, structures of the spring seats 72 and 73 will now be described. The spring seats 72 and 73 are preferably constructed as one-piece, unitary members that are made of hard resin or elastic resin. The elastic resin is, e.g., a thermo plastic polyester elastomer. As seen in FIGS. 13 and 14, a seat portion 74 of each of the spring seats 72 and 73 has a seat surface 75 for receiving the end turn surface of the coil spring 83. As seen in FIGS. 13 and 15, a rear surface 78 remote from the seat portion 74 is supported in the windows 31 and 68. As can be seen from FIG. 14, the seat surface 75 has a circular form. The seat surface 75 has a substantially flat first semicircular section 75a and a second semicircular section 75b having an inclined surface which rises as the position moves clockwise or counterclockwise in the plan view. One end of the second semicircular section 75b is continuous with the first semicircular section 75a, and the other end of the second semicircular section 75b forms a stepped portion with respect to the first semicircular section 75a. This stepped portion provides a contact surface 75c directed in the circumferentially direction of the seat surface 75. As seen in FIGS. 13 and 14, the seat surface 75 is complementary in shape with the end turn surface of the coil spring 83. Further, the contact surface 75c is in contact with the end surface of the end turn.

Figure 17:
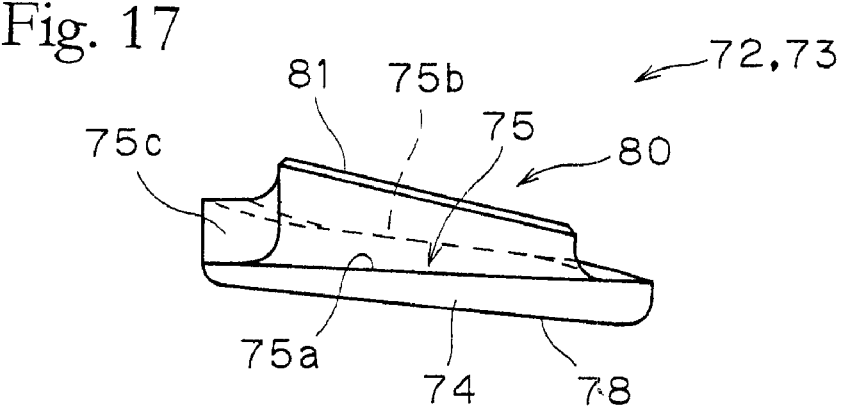
FIG. 17 is a perspective view of the spring seat of FIG. 14 as viewed along arrow XVII in FIG. 14.
Figure 18:
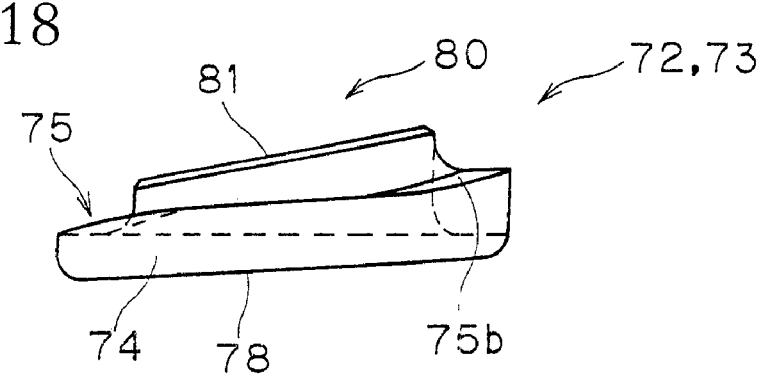
FIG. 18 is a perspective view of the spring seat of FIG. 14 as viewed along arrow XVIII in FIG. 14.

As shown in FIGS. 13 and 15, the seat portion 74 is provided with a projection 80 projected toward the circumferential center of the window 31. The projection 80 has a substantially columnar form. As seen in FIGS. 13 and 17, a top surface 81 of the projection 80 extends straight in the axial direction. However, the top surface 81 is inclined in an elevational view (i.e., when viewed in the axial direction). The incline of the top surface 81 is such that a radially outer portion thereof is shifted away from the center of the window 31 with respect to the radially inner portion thereof.

As seen in FIGS. 13 and 15, the rear surfaces 78 of the spring seats 72 and 73 are in contact with and are supported by the rotating-direction support portions 69c and 69d of the window 68. In this state, the spring seats 72 and 73 can move away in the rotating direction from the rotating-direction support portions 69c and 69d (i.e., toward the circumferentially opposite ends), respectively, but are unmovable in the axial and radial direction. Further, the spring seats 72 and 73 are engaged with the clutch and retaining plates (similar to that shown in FIG. 1) in such a fashion that does not allow rotation around the central axis P—P of the coil spring 83, shown in FIG. 19. Referring again to FIGS. 13 and 15, rotation is suppressed because the rotating-direction support portions 69c and 69d, which support the spring seats 72 and 73, respectively, are not parallel to each other in an elevational view. Rather, the rotating-direction support portions 69c and 69d are inclined with respect to each other.

Furthermore, the spring seats 72 and 73 are supported by the rotating-direction support portions 33 and 34 of the window 31, respectively. More specifically, the rear surfaces 78 are in contact with the rotating-direction support portions 33 and 34, respectively. Referring to FIG. 19, in this engaged state, the spring seats 72 and 73 can be spaced in the rotating direction from the rotating-direction support portions 33 and 34 (toward the opposite ends, respectively). However, the spring seats 72 and 73 are axially and radially nonrotatable with respect to the rotating-direction support portions 33 and 34. In this state, the spring seats 72 and 73 are engaged with the hub flange 6 in such a fashion that the spring seats 72 and 73 can not rotate around the central axis P—P of the coil spring 83, please refer to FIGS. 13 and 19. This is owing to the fact that the rotating-direction support portions 33 and 34, which support the spring seats 72 and 73, respectively, are not parallel to each other in an elevational view. Rather, the rotating-direction support portions 33 and 34 are inclined with respect to each other.

Referring to FIGS. 15 and 19, each of the circumferentially opposite end surfaces of the coil spring 83 is entirely in contact with the seat surface 75 of the seat portion 74. The section of the end of the coil spring 83 is in contact with the contact surface 75c. Thereby, the coil spring 83 cannot rotate around its own central axis P—P with respect to the spring seat pair 72 and 73. Thus, the contact surfaces 75c of the paired spring seats 72 and 73 are directed oppositely to each other in the winding direction of the coil spring 83. Therefore, the coil spring 83 can rotate in neither direction around the central axis P—P. In the coil spring 83 arranged as described above, there are five turns on the radially inner side, and four turn on the radially outer side (excluding for the end turns). Thus, the number of turns on the radially inner side is larger by one than the number of turns on the radially outer side. The coil spring 83 does not rotate around the spring central axis P—P with respect to the spring seats 72 and 73. In addition, the spring seats 72 and 73 do not rotate with respect to the plates (similar to that shown in FIG. 1) and others around the spring central axis P—P. Therefore, the above state of the coil spring 83 is maintained. Thus, the number of turns on the radially inner side of the coil spring 83 is always larger than the number of turns on the radially outer side.

Figure 20:
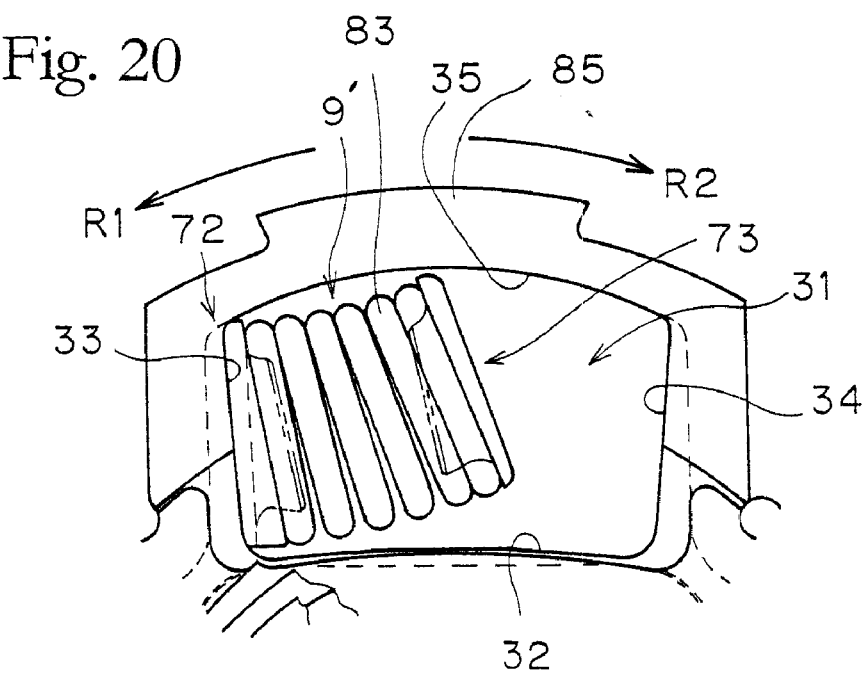
FIG. 20 is an elevational view showing the coil spring assembly illustrated in FIG. 19 after compression of the coil spring according to an embodiment of the present invention.

The operation of the clutch disk assembly 1' will now be described below. The clutch plate and the retaining plate which are in the free state shown in FIG. 1 are twisted or rotated relatively to the hub flange 6 in the direction of the arrow R1 as shown in FIG. 20. Thereby, the coil spring 83 is compressed in the rotating direction between the rotating-direction support portion 33 of the window 31 and the rotating-direction support portions 69d of the windows 71 as shown in FIGS. 13 and 20. In this operation, the radially outer portions of the coil springs 83 are deformed by a larger amount than the radially inner portions. However, the difference in amount of deformation per turn is smaller than that in the prior art. This small difference occurs between the radially outer and inner portions because the number of turns of the radially inner portion is larger than the number of turns of the radially outer portion. Thus, the radially outer portion causes a larger deformation per turn than the radially inner portion. However, the difference between them is smaller than that in the prior art. The foregoing structure can suppress a difference in generated stress between the radially inner and outer portions of the coil spring 83. In other words, a difference that occurs in stress generated per turn between the radially inner and outer portions can be small.

Since the radially outer portion of the coil spring 83 has the turns, which are smaller in number, the coil spring 83 in the fully compressed state is short. This means that the elastic coupling portion 4 can provide a large maximum torsion angle.

Since the coil spring 83 has end turns whose surfaces are not subjected to grinding, the cost thereof is relatively low. The spring seats 72 and 73 are relatively inexpensive. The structure of the invention is more advantageous than structures in which the spring seats are not used and coil springs having end surfaces subjected to grinding are employed. Since the coil spring 83 is not subjected to grinding, breakage thereof can be suppressed effectively. Since grinding is not performed, the end of the coil spring 83 can reliably have an area similar to that of the other portion, and therefore can be reliably in contact with the contact surface 75c.

FIG. 20 shows a state where the coil spring 83 is fully compressed. FIGS. 21a and 21b show the closed end structures of the coil springs 83 which are the same for the coil springs 41 of the first embodiment.

The relationships among the coil spring, the spring seats and the damper mechanism in the first and second embodiments will now be briefly summarized. The end turns 85 of the coil springs 41 or 83 has a closed form, and has not been finished by a grinding process. Therefore, the circumferentially extending end surface 86 of the coil spring 41 or 83 is defined by the wire form itself, and is not flat. Further, a wire end surface 87 of the end turn 85 has the substantially same form as the section of the coil wire.

The circumferentially extending end surfaces 86 of the coil springs 41 or 83 are entirely in contact with the seat surfaces 47 or 75 of the seat portions 46 or 74. Further, the wire end surfaces 87 of the coil springs 41 or 83 are in contact with the contact surfaces 47c or 75. Thereby, the coil spring 41 (83) cannot rotate around its own central axis P—P with respect to the spring seat pair 42 and 43 or 72 and 73. Thus, the contact surfaces 47c or 75 of the paired spring seats 42 and 43 or 72 and 73 are directed oppositely to each other in the winding direction of the coil spring 41 or 83. Thus, the coil spring 41 or 83 can rotate in neither direction around the central axis P—P. In the coil spring 41 or 83 arranged as described above, the number of turns on the radially inner side is larger by one than the number of turns on the radially outer side. The coil spring 41 or 83 does not rotate around the spring central axis P—P with respect to the spring seats 42 and 43 or 72 and 73. Further, the spring seats 42 and 43 or 72 and 73 do not rotate with respect to the plates 12 and 13 and others around the spring central axis P—P. Therefore, the above state of the coil spring 41 or 83 is maintained. Thus, the number of turns on the radially inner side of the coil springs 41 or 83 are always larger than the number of turns on the radially outer side.

Third Embodiment

Referring now to FIGS. 22a and 22b, the end structures of the coil springs 88 of a third embodiment of the present invention are illustrated. The coil spring 88 has end turns 89, which have closed forms and are prepared by grinding. Therefore, the end surfaces 90 of the coil spring 88 are substantially flat. The coil spring 88 can be utilized with the spring seats 42 and 43 or 72 and 73, which are discussed above. However, the seat surfaces 47 or 75 of the spring seats should be modified to have the corresponding shape of the end turns 89. More specifically, since the coil spring has ground end turns 89, the seat surface 47 or 75 of the spring seats should have a shorter inclined section of about 25° and a remaining non-inclined section. Thus, the coil spring 88 will cooperate with the spring seat in substantially the same way as the preceding embodiments. The coil end surface 90 of the end turn 89 is smaller in cross-section than the cross-section of the rest of the coil wire.

Referring to FIGS. 4 and 22, the circumferentially extending end surface 90 of the coil spring 88 is entirely in contact with the seat surface 47 or 75 of the seat portion 46 or 74. Thus, in contrast to the first and second embodiments, the seat surface 47 or 75 has a substantially flat form. Furthermore, the wire end surface 91 of the coil spring 88 is in contact with the contact surface 47c or 75c. Thereby, the coil spring 88 cannot rotate around its own central axis P—P with respect to the spring seat pair 42 and 43. Thus, the contact surfaces 47c or 75c of the paired spring seats 42 and 43 or 72 and 73 are directed oppositely to each other in the winding direction of the coil spring 88. Thus, the coil springs 88 cannot rotate in either direction around the central axis P—P. In the coil spring 88 arranged as described above, the number of turns on the radially inner side is larger by one than the number of turns on the radially outer side. The coil spring 88 does not rotate around the spring central axis P—P with respect to the spring seats 42 and 43 or 72 and 73. Further, the spring seats 42 and 43 or 72 and 73 do not rotate with respect to the clutch plate or the retaining plate and others around the spring central axis P—P. Therefore, the above state of the coil spring 88 is maintained. Thus, the number of turns on the radially inner side of the coil spring 88 is always larger than the number of turns on the radially outer side.

In this embodiment, since the end turns of the coil spring are ground, it is impossible to achieve the same effect as a structure not subjected to the grinding process. However, the effect achieved by preventing rotation of the coil spring around its own axis can be achieved similarly to the foregoing embodiments.

The seat surface of the spring seat can have a form complementary with the form of the end turn surface of the coil spring. Whereby the amount removed by grinding can be smaller than that in the prior art, or can be minimized. In this case, the breakage and damage of the end of the coil spring can be suppressed more effectively than the prior art.

Fourth Embodiment

Figure 23:
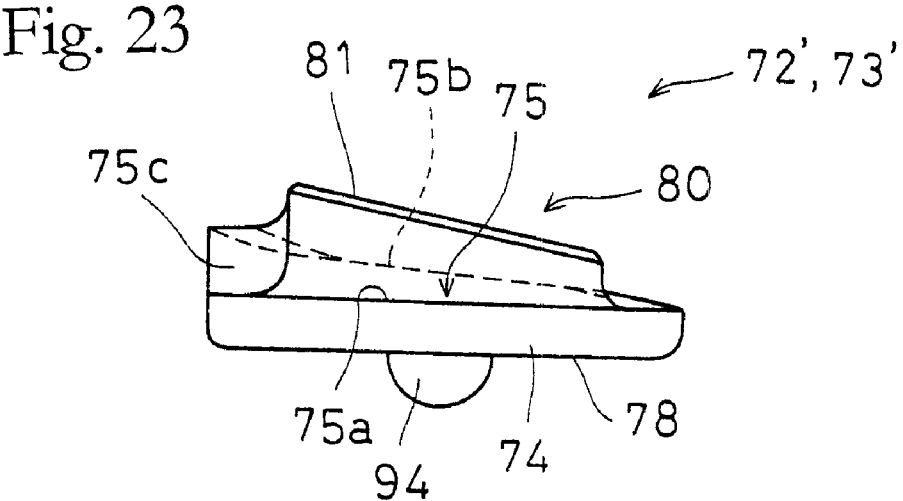
FIG. 23 is a side elevational view of a spring seat to be used in a coil spring assembly in accordance with yet another embodiment of the present invention.
Figure 24:
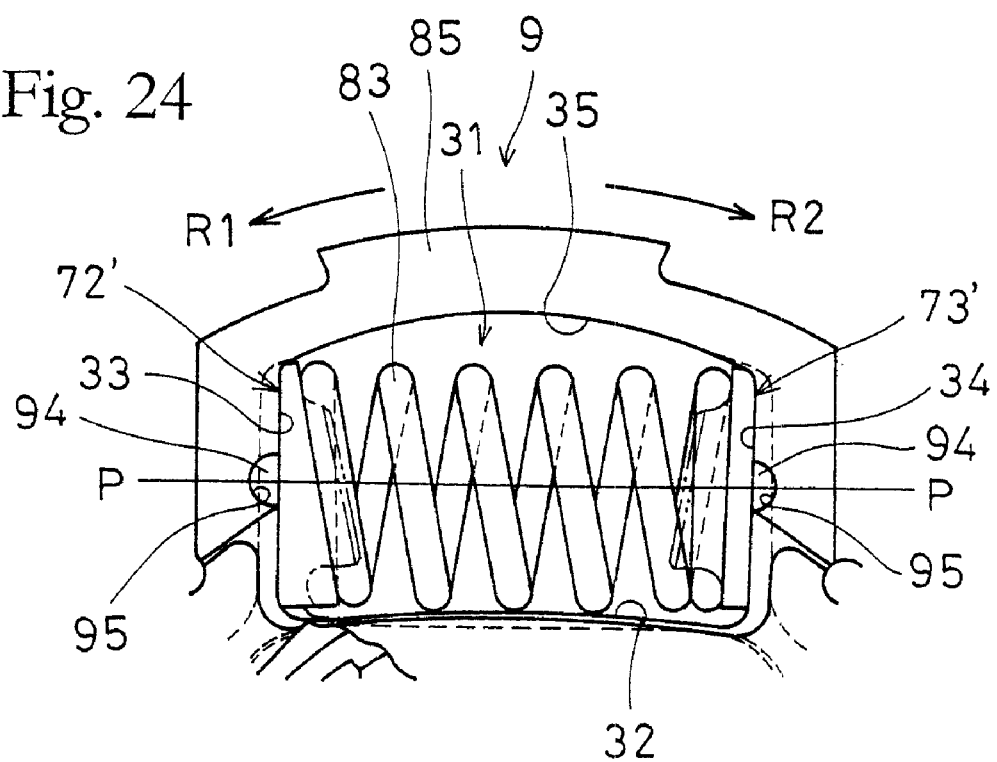
FIG. 24 is a partial elevational view of a coil spring assembly of a clutch disk assembly showing a relationship between the coil spring assembly, a hub flange, and the spring seat of FIG. 23.

Referring now to FIGS. 23 and 24, a further modified spring assembly is illustrated in accordance with the present invention. In the first to third embodiments, the rotation of the spring seat pair around the axis of the coil spring is prevented by a structure such that the paired spring seats are supported by the nonparallel surfaces, i.e., the rotating-direction support surfaces of the windows in the hub flange and the plate. In this fourth embodiment, a different structure is employed for achieving the same function of preventing rotation.

In an embodiment shown in FIGS. 23 and 24, spring seats 72' and 73' are provided at their rear surfaces 78 with projections 94 (engagement portions), respectively. Each projection 94 extends axially from the radially middle portion of the rear surface 78, and has a semicircular cross-section. As shown in FIG. 24, the rotating-direction support portions 33 and 34 of the window 31 are parallel to each other in this embodiment. The rotating direction support portions 33 and 34 are each provided with engagement concavities 95 for engagement with the projections 94, respectively. When the spring seats 72' and 73' are engaged with the rotating-direction support portions 33 and 34 of the window 31, the spring seats 72' and 73' cannot rotate relatively to the window 31. Thus, the coil spring 83 is prevented from rotation around its own axis P—P. Although not shown, the rotating-direction support surfaces of the windows 25 and 26 of the paired plates 12 and 13 on the input side are likewise parallel to each other, and are provided with engagement concavities for engagement with the projections 94.

Other Embodiments

Although the coil springs in the foregoing embodiments have the closed end, the coil spring may have open ends. The number and direction of the turns of the coil spring as well as the sectional form may be different from those in the foregoing embodiments.

The structure of the clutch disk assembly 1 is not restricted to those of the foregoing embodiments. For example, the invention can be applied to a clutch disk assembly, in which a hub and a hub flange are integrally formed of a single member. Moreover, the coil spring assembly and the damper mechanism according to the invention can be applied not only to the clutch disk assembly but also to various power transmission devices other than the above. For example, the invention can be applied to a flywheel assembly, in which two flywheels are elastically coupled together in the rotating direction, and a lockup device of a torque converter. In the coil spring assembly according to the invention, the end turns of the coil springs are not ground, and the paired spring seats support the unground end turns, respectively. Thus, breakage of the coil spring end can be suppressed.

The terms of degree such as "substantially," "about" and "approximately" as used herein mean a reasonable amount of deviation of the modified term such that the end result is not significantly changed. These terms should be construed as including a deviation of ±5% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A coil spring assembly for use in a damper mechanism for transmitting a torque and dampening torsional vibrations, said coil spring assembly comprising:
   a coil spring formed from a wire having first and second end surfaces with a plurality of turns including first and second end turns being formed between said first and second end surfaces, said first and second end turns having first and second primarily axially facing coil surfaces that extend about 360° from said first and second end surfaces, respectively, said first and second coil surfaces facing in opposite directions away from each other; and
   a pair of spring seats each having a seat surface that faces primarily in an axial direction toward an opposite one of said spring seats, each said seat surface contacts about 360° of one of said end turns, said seat surfaces of said spring seats including a center axis and an inclined section inclining relative to said center axis said inclined section being a semicircular section arranged around a central axis of said coil spring.

2. A coil spring assembly for use in a damper mechanism for transmitting a torque and dampening torsional vibrations, said coil spring assembly comprising:
   a coil spring formed from a wire having first and second end surfaces with a plurality of turns including first and second end turns being formed between said first and second end surfaces, said first and second end turns having first and second primarily axially facing coil surfaces that extend about 360° from said first and second end surfaces, respectively, said first and second coil surfaces facing in opposite directions away from each other; and
   a pair of spring seats each having a seat surface that faces primarily in an axial direction toward an opposite one of said spring seats, each said seat surface contacting about 360° of one of said end turns, and each said seat surface having a contact surface extending along a center axis of said coil spring, said contact surface being configured to contact a terminus of one of said end surfaces in a direction along said center axis of said coil spring, each said seat surface including an inclined section inclining relative to a plane extending perpendicular to said center axis of said coil spring, and a non-inclined section congruent with a plane extending perpendicularly to said center axis.

3. The coil spring assembly according to claim 2, wherein said non-inclined section and said inclined section are semicircular.

4. The coil spring assembly according to claim 3, wherein said seat surfaces surround center projections of said spring seats.

5. The coil spring assembly according to claim 2, wherein said end turns of said coil spring being non-ground.

6. The coil spring assembly according to claim 2, wherein said wire of said coil spring having a substantially uniform cross-section.

7. A damper mechanism comprising:
   an input rotary member;
   an output rotary member; and
   at least one coil spring assembly for elastically coupling said input rotary member and said output rotary member together in a rotating direction, said coil spring assembly including a coil spring and a pair of spring seats, said coil spring being formed from a wire having first and second end surfaces with a plurality of turns including first and second end turns being formed between said first and second end surfaces, said first and second end turns having first and second primarily axially facing coil surfaces that extend about 360° from said first and second end surfaces, respectively, said first and second coil surfaces facing in opposite directions away from each other, said spring seats each having a seat surface that faces primarily in an axial direction toward an opposite one of said spring seats, each said seat surface contacting about 360° of one of said end turns, and each said seat surface having a contact surface extending substantially parallel to a center axis of said coil spring, said contact surface being configured to contact a terminus of one of said end surfaces in a direction along said center axis of said coil spring.

8. The damper mechanism according to claim 7, wherein each of said spring seats further has an engagement portion, said engagement portion being adapted to be coupled to said damper mechanism to prevent rotation relative to the damper mechanism around said center axis of said coil spring.

9. The damper mechanism according to claim 7, wherein said seat surfaces of said spring seats include a center axis and an inclined section inclining relative to said center axis.

10. The damper mechanism according to claim 9, wherein each of said seat surfaces of said spring seats further includes a non-inclined section congruent with a plane extending perpendicularly to said center axis.

11. The damper mechanism according to claim 10, wherein said non-inclined section and said inclined section are semicircular.

12. The damper mechanism according to claim 11, wherein said seat surfaces surround center projections of said spring seats.

13. The damper mechanism according to claim 7, wherein said end turns of said coil spring being non-ground.

14. The damper mechanism according to claim 7, wherein said wire of said coil spring having a substantially uniform cross-section.

15. A damper mechanism comprising:
an input rotary member;
an output rotary member; and
at least one coil spring assembly for elastically coupling said input rotary member and said output rotary member together in a rotating direction, said coil spring assembly including a coil spring and a pair of spring seats, said coil spring being formed from a wire having first and second end surfaces with a plurality of turns including first and second end turns being formed between said first and second end surfaces, said first and second end turns having first and second primarily axially facing coil surfaces that extend about 360° from said first and second end surfaces, respectively, said first and second coil surfaces facing in opposite directions away from each other, said spring seats each having a seat surface that faces primarily in an axial direction toward an opposite one of said spring seats, each said seat surface contacts about 360° of one of said end turns said turns of said coil spring on a radially inner side of said damper mechanism being greater in number than said turns of said coil spring on a radially outer side.

16. The damper mechanism according to claim 15, wherein
said seat surfaces surround center projections of said spring seats.

17. A damper mechanism comprising:
an input rotary member;
an output rotary member; and
at least one coil spring assembly for elastically coupling said input rotary member and said output rotary member together in a rotating direction, said coil spring assembly including a coil spring and a pair of spring seats, said coil spring being formed from a wire having first and second end surfaces with a plurality of turns including first and second end turns being formed between said first and second end surfaces, said first and second end turns having first and second primarily axially facing coil surfaces that extend about 360° from said first and second end surfaces, respectively, said first and second coil surfaces facing in opposite directions away from each other, said spring seats each having a seat surface that faces primarily in an axial direction toward an opposite one of said spring seats, each said seat surface contacts about 360° of one of said end turns, said seat surfaces of said spring seats including a center axis and an inclined section inclining relative to said center axis, said inclined section is a semicircular section arranged around a central axis of said coil spring.

18. A damper mechanism comprising:
an input rotary member;
an output rotary member; and
at least one coil spring assembly for elastically coupling said input rotary member and said output rotary member together in a rotating direction, said coil spring assembly including a coil spring and a pair of spring seats, said coil spring being formed from a wire having first and second end surfaces with a plurality of turns including a pair of end turns being formed between said first and second end surfaces, said pair of spring seats being engaged with said end surfaces of said coil spring such that said coil spring is nonrotatable around its central axis relative to said spring seats, said pair of spring seats being engaged with said input and output rotary members and being nonrotatable relative to said input and output rotary members around the central axis of said coil spring, said turns of said coil spring on a radially inner side of said damper mechanism being greater in number than said turns of said coil spring on a radially outer side,
said spring seats being arranged relative to said input and output rotary members such that one of said spring seats disengages from one of said input and output rotary members upon relative rotational movement of said input and output rotary members and compression of said coil spring.

19. The damper mechanism according to claim 18, wherein
said end turns of said coil spring being non-ground.

20. The damper mechanism according to claim 18, wherein
said wire of said coil spring having a substantially uniform cross-section.

21. The damper mechanism according to claim 18, wherein
each of said spring seats has a seat surface that contacts about 360° of one of said end turns.

22. The damper mechanism according to claim 21, wherein
said seat surfaces of said spring seats include a center axis and an inclined section inclining relative to said center axis.

23. The damper mechanism according to claim 22, wherein
said inclined section is a semicircular section arranged around the central axis of said coil spring.

24. The damper mechanism according to claim 22, wherein
each of said seat surfaces of said spring seats further includes a non-inclined section congruent with a plane extending perpendicularly to said center axis.

25. he damper mechanism according to claim 24, wherein
said seat surfaces surround center projections of said spring seats.

26. The damper mechanism according to claim 18, wherein
seat surfaces surround center projections of said spring seats.

* * * * *